April 23, 1935.  D. FISCHER  1,998,712
SUPPORTING DEVICE FOR THE TRAILERS OF SADDLE TRACTORS
Filed Jan. 5, 1933

Inventor:
Dietrich Fischer.

Patented Apr. 23, 1935

1,998,712

UNITED STATES PATENT OFFICE 1,998,712

SUPPORTING DEVICE FOR THE TRAILERS OF SADDLE TRACTORS

Dietrich Fischer, Hamburg Germany

Application January 5, 1933, Serial No. 650,327
In Germany January 5, 1932

1 Claim. (Cl. 280—33.1)

This invention relates to a supporting device arranged on the platform of the saddle tractor for the trailers of saddle tractors, which serves for relieving from the weight of the trailer the coupling elements which are arranged partly on the platform of the saddle tractor and partly on the trailer. As is known, supporting brackets were hitherto provided on the frame of the saddle tractor, on which brackets the front portion of the trailer frame rests. These supporting brackets are often provided with rollers rotatably mounted on a supporting bolt arranged transversely to the longitudinal direction of the vehicle. If, during the coupling, the two vehicles are mutually approached, the frame of the trailer slides over the rollers and remains resting on the rollers when the vehicles are coupled.

It has, however, been found that these known arrangements are open to the objection that the trailer frame rubs on the rollers both during the coupling operation and also when the vehicles are travelling. If, for example, the trailer runs slightly displaced towards one side on to the saddle tractor during the coupling up, the coupling element on the trailer is pushed laterally into the desired position by guide bars. As the trailer frame already rests on the rollers, it is shifted at an angle to the direction of rotation of the rollers. Owing to the weight of the trailer which is often very heavy, the rollers, or their fixing means, are strongly stressed. Moreover, the coupling is thereby rendered difficult because in this instance the rollers exert a braking effect. However, also when the vehicles are travelling, both when veering and turning, the rollers are subjected to considerable lateral forces. As soon as the two vehicles assume an angle, the one to the other, even if this angle is only very slight, the trailer slides on the rollers at an angle to their direction of rotation. Thus, both the material of the rollers, but particularly their journals and fixing means are considerably stressed, and these parts must be made impractically strong, or they are liable to destruction.

These objections are overcome by the invention. The characteristic feature of the invention consists in that the known supporting roller for the trailer arranged on the saddle tractor is journalled in a bracket running on ball bearings and rotatable around a vertical pivot bolt, the axis of rotation of the roller being situated laterally of the fulcrum of the supporting bracket. By this latter measure a lever is formed between the roller and the fulcrum of the supporting bracket, which lever causes the slewing of the roller under lateral pressure.

An embodiment of the invention is illustrated by way of example in the accompanying drawing in which:—

Figure 1:
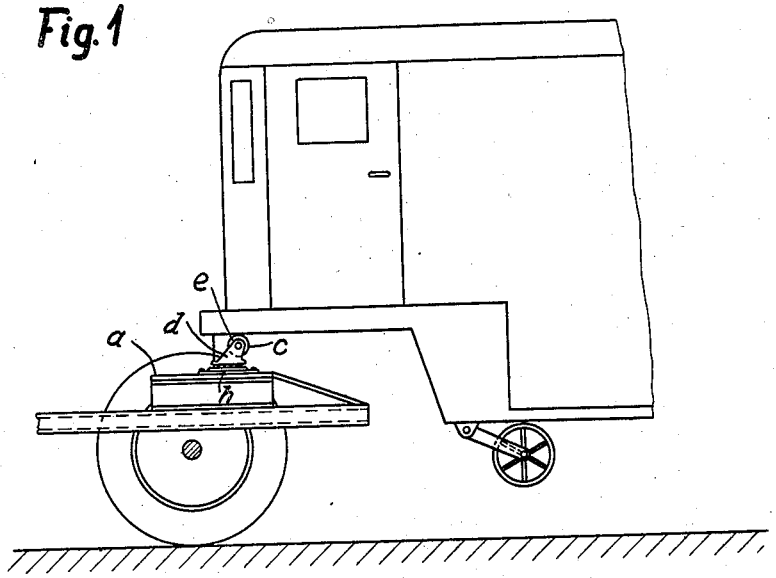
Fig. 1 is a side elevation of a part of the saddle tractor and of the trailer.
Figure 2:
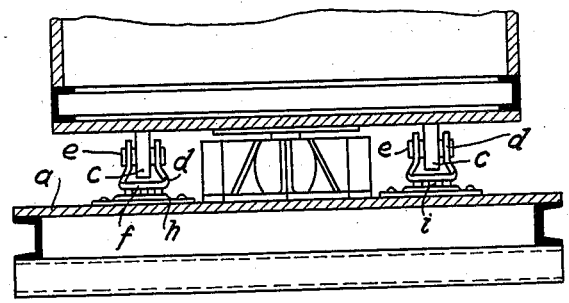
Fig. 2 is a cross section through the supporting device.
Figure 3:
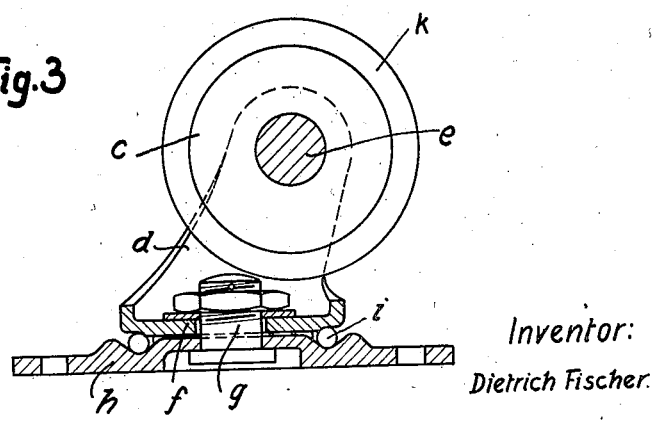
Fig. 3 shows the supporting bracket of the supporting roller in vertical section.
Figure 3:

On a platform $a$ of the saddle tractor two rollers $c$ are arranged side by side at a distance apart as support for the front portion of the trailer. The rollers $c$ are each rotatably mounted on a horizontal bolt $e$ in a supporting bracket $d$. The supporting bracket $d$ has a base plate $f$, which is connected to a foot plate $h$ by a vertical bolt $g$ in such a manner that supporting bracket $d$ can oscillate around the bolt $g$. A ball bearing $i$ is arranged between the base plate $f$ of the supporting bracket and the foot plate $h$, which is fixed on the platform $a$ of the saddle tractor.

The bolt $e$ of the roller $c$ is arranged laterally the bolt $g$ of the supporting bracket $d$. The roller is preferably provided with a cover $k$ of rubber or the like, in order to absorb vertical shocks caused by the spring suspension.

The supporting wheels pivotally mounted on the trailer near the coupling, are arranged on rocker levers of such length that a reliable gliding of the coupling bolt provided on the trailer on to the platform of the saddle tractor is insured, whereas the coupling bolt is of such length that the bearing surface of the trailer is situated above the horizontal bolt $e$ of the supporting rollers $c$, when the trailer runs on the rollers $c$.

During the coupling of the vehicles, the rollers are preferably first brought parallel to one another. If the trailer runs on to the saddle tractor slightly from the side, it is displaced in lateral direction into the proper position by a suitable arrangement in known manner. This lateral movement of the trailer takes place until the coupling elements interengage. During this movement the trailer already rests on the rollers. Owing to the arrangement of the rollers they can participate in the lateral movement, so that the trailer does not slide on the rollers. The distance between the vertical central axis through the bolt $e$ of the roller and the vertical central axis through the pivot pin $g$ of the supporting bracket can be chosen as is necessary for practical requirements.

By the invention the particular advantage is attained that, as the vehicles when travelling mutually alter their position when veering and turning, the trailer does not slide on the rollers. In this instance the rollers retain their position relative to the trailer and their brackets pivot around their pivot bolts g. The considerable stresses hitherto occurring on the rollers in such instances are thereby avoided. At the same time the premature wear of the coupling elements, caused by the vertical shocks produced by the spring suspension, is prevented by the rubber cover of the supporting rollers.

I claim:

A supporting device for trailers on saddle tractors, comprising in combination a platform on the saddle tractor, supporting brackets on said platform one on each side of the coupling, each bracket having a pair of upwardly directed arms, horizontal bolts one journalled in the pair of arms of each bracket, rollers one rotatably mounted on each of said horizontal bolts, and vertical bolts eccentric to said roller pivotally connecting said brackets to said platform.

DIETRICH FISCHER.